Oct. 19, 1954 A. E. GRAVES 2,692,302
MOUNTING ARRANGEMENT FOR LOADING COILS
AS USED FOR TELECOMMUNICATION PURPOSES
Filed Aug. 3, 1951 2 Sheets-Sheet 1

INVENTOR.
ALBERT ERNEST GRAVES
BY
Lippincott & Smith
ATTORNEYS

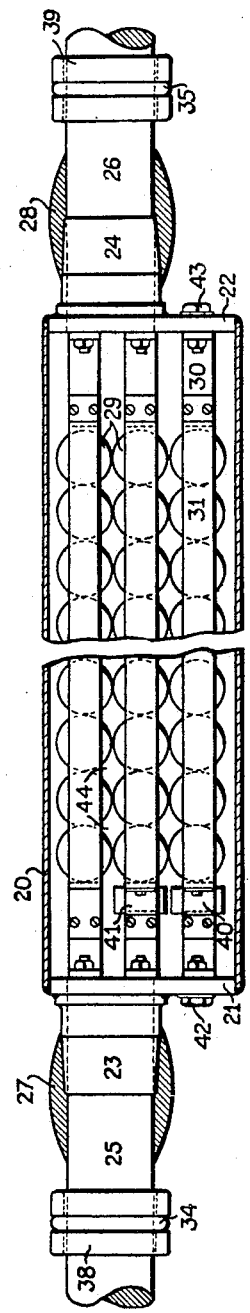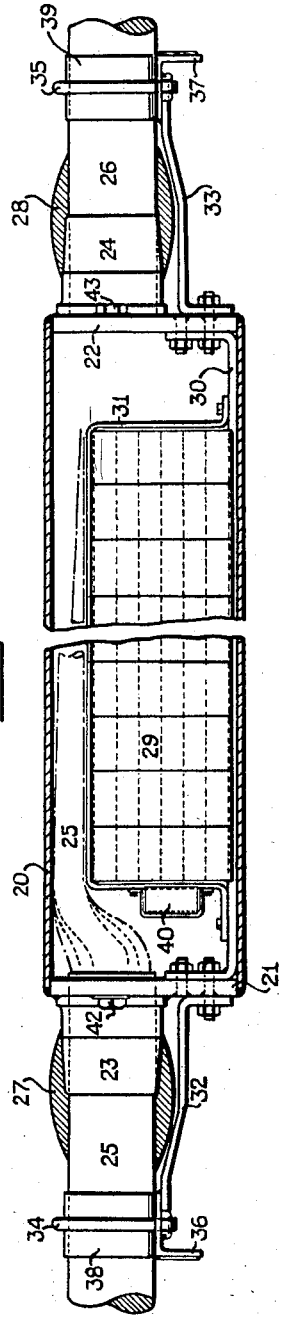

Patented Oct. 19, 1954

2,692,302

UNITED STATES PATENT OFFICE 2,692,302

MOUNTING ARRANGEMENT FOR LOADING COILS AS USED FOR TELECOMMUNICATION PURPOSES

Albert Ernest Graves, Liverpool, England, assignor to Automatic Telephone & Electric Company Limited, Liverpool, England, a British company Application August 3, 1951, Serial No. 240,161

Claims priority, application Great Britain August 18, 1950

6 Claims. (Cl. 178—46)

The present invention relates to improvements in mounting arrangements for loading coils such as are commonly inserted in telecommunication transmission lines, and is principally concerned with the arrangement and mounting of a plurality of such coils within a case or container.

Loading coil cases may be required to contain several hundreds of coils and when it is required to mount them in confined spaces such as cable tunnels, it is essential that their overall dimensions, particularly as regards width and depth, should be as small as possible. Generally the conditions obtaining in cable tunnels are not so severe as those encountered by loading coil cases which are buried directly in the ground, in that damage by corrosion or impact is less likely. Consequently it is often permissible, as regards loading coil cases for mounting in cable tunnels, to dispense with the heavy and bulky castings employed for buried type cases and to replace them by a lighter and more compact construction which is nevertheless sufficiently protective to meet the requirements. Even so the need for mounting the loading coils in a compact and orderly manner still remains, and, particularly when large numbers of coils are involved, the layout of the coils with respect to the incoming and outgoing cables should be such that the space within the case required for feeding the cable conductors to the coils and for effecting the necessary soldered connections shall be as small as possible so as to enable the overall dimensions of the case to be reduced.

It is the object of the invention to provide an improved container and mounting arrangement for a plurality of loading coils which is compact, simple in construction and which enables connections between the cables and the coils to be effected in a neat and orderly manner.

According to one feature of the invention in a loading coil container of elongated shape having stub cables connected to its ends a plurality of screened coil assemblies each comprising a column of coils are arranged in one or more rows with the axes of the columns parallel to one another and perpendicular to the length of the container.

According to another feature of the invention in a loading coil container a plurality of screened coil assemblies each comprising a column of coils within a screening cylinder are mounted between parallel supporting bars and are held in position by slots or the like in the edges of the screening cylinder engaging with the bars.

According to a further feature of the invention in a loading coil assembly comprising a plurality of loading coils mounted in a column on a common axis support for the coils and screening from adjacent columns are effected by a substantially rectangular stamping of springy metal which is rolled up to form a cylinder and includes metallic discs which serve to separate and screen the individual coils of the column.

The invention will be better understood from the following description of one embodiment which should be read in conjunction with the accompanying drawings comprising Figs. 1–4.

Of the drawings,

Fig. 2 is a partly sectioned plan view of the container with coils in position.

Fig. 3 is a partly sectioned side elevation corresponding to Fig. 2, and

Figure 4:
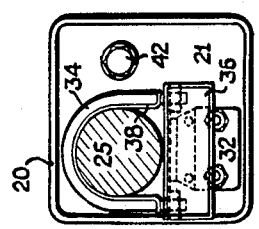

Fig. 4 an end elevation of the arrangement corresponding to Fig. 2 as seen from the left.

Figure 1:
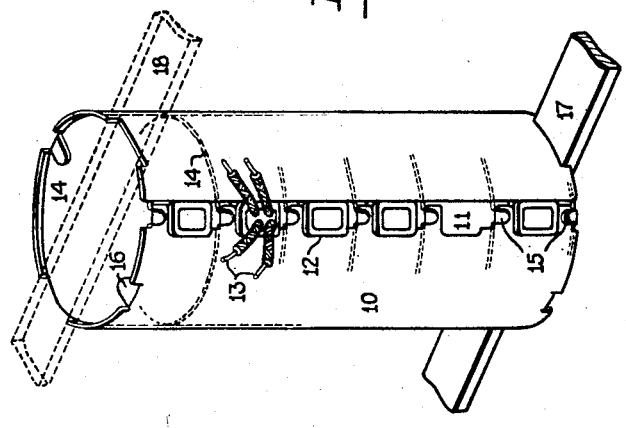
Fig. 1 shows a preferred form of the screened coil assembly and its mounting arrangement.

Referring to Fig. 1, the coil assembly in the preferred embodiment contains six coils mounted coaxially within the cylindrical screen 10. The screen may be made of comparatively springy copper or other conducting material, being formed from a stamped sheet with the abutting edges left without a mechanical joint. In one edge of the sheet, cutout portions 11 of the shape shown are made which, when the screen is rolled into a cylinder, form apertures into which insulating grommets 12 are inserted. The grommets serve to protect the incoming and out-going insulated leads 13 of the coils from the metal edges of the aperture, and are preferably attached to the coils to overcome any tendency of the latter to rotate within the cylinder. The arrangement of not completely closing the cylinder enables the edges to be parted when inserting the coils so that the grommets are able to pass down the slot so formed.

Between adjacent coils, and also at the top and bottom of the assembly, conducting disc-shaped screens 14 are inserted, these being electrically connected to the cylindrical screen by means of soldering tags 15. To provide a more rigid construction the circular screens may also be attached to the cylinder at points diametrically opposite the tags 15, for instance by means of small outwardly extending lugs formed in said screens and arranged to engage with lateral slots in the cylinder. Lugs 16 provided at the top and bottom of the cylinder are folded over to retain the end screens in position, but these may be dispensed with if the above-mentioned additional supporting arrangement is employed so that a folding operation is eliminated. The cylinder is slotted at top and bottom to engage with the supporting bar 17 and the clamping bar 18. Since the cylinders are not closed and the material is flexible, the coil units become self-aligning on the supporting bars. Once mounted, the cylinders cannot open because of the locking action of the bars in the slots.

This arrangement of coils into individually screened assemblies has the advantage of facility in handling, particularly in the final stages, and allows each assembly to be tested before the connection of the coils to the cables is completed. It involves also a considerable saving in materials over previous screening arrangements, while the method of producing the unit is relatively simple, no bolts or similar fastening means being required.

Referring now to Fig. 2, this shows a typical arrangement of coil assemblies in the container. This comprises the rectangular casing 20 which may be, for example, a steel tube having steel end plates 21 and 22 welded to it. In the drawings all welded joints are shown blacked in. To the endplates 21 and 22 are welded glands 23 and 24 through which the stub cables 25 and 26 pass into the container 20, the entry being sealed by wiped joints at 27 and 28.

The coil assemblies 29 are conveniently mounted as shown in three rows running in the direction of the cable, this arrangement allowing the container to be narrow, which is an advantage when the assembly is located in a duct or tunnel. Each row of coil assemblies 29 is mounted on a support bar such as 30 (corresponding to 17 in Fig. 1) seen more clearly in Fig. 3, and is held in position by a clamping bar 31 (corresponding to 18 in Fig. 1). It will be seen from the drawings that the ends of bolts passing through the endplates 21 and 22 are welded to the endplates, this being necessary to render the casing watertight.

It is essential that the wiped joints, which are formed where the lead-sheathed stub cables enter glands 23 and 24, shall be protected against possible mechanical stress and this is accomplished by adding a pair of brackets 32 and 33 which are bolted to the endplates 21 and 22, and to which the stub cables 25 and 26 are clamped on the side of the joints remote from the endplates. The clamping is effected by means of the U-shaped members 34 and 35 co-operating with angle brackets 36 and 37 which in turn are welded to brackets 32 and 33. Collars 38 and 39 are inserted round the stub cables underneath the U-shaped clamps 34 and 35 to distribute the pressure, thus avoiding damage to the lead sheath of the cable. The use of the angle brackets 36 and 37 minimises the tendency of the brackets 32 and 33 to conform to the shape of the cable, while their vertical portions provide a convenient location for the cable designation label holder.

Sufficient room is left in the container beyond the ends of the coil units for housing odd coils. These may be mounted in individual housings on the clamping bars 31, as indicated by 40 and 41 in the drawings.

The conductors of the stub cables are distributed to the coils through the space above the coil units. Showing of the arrangement is omitted from Fig. 2 for the sake of clarity but it is indicated in Fig. 3 where an outline of the stub cable 25 is seen. The conductors are divided into three branches which extend along the top of the three rows of coil assemblies, the appropriate pairs being led down into the spaces between the insulating screens to connect to the coils. It is arranged that all the outlets from the cylindrical assemblies face in the same direction, roughly 45° to the direction of the rows, so that in each case the connections to one coil assembly only occupy the space between that assembly and the adjacent ones.

The positioning of the outlets of the coil assemblies at 45° to the direction of the cable means that the small apertures in the cylinder representing unscreened portions of the coils are made to face screened portions of the adjacent coil assemblies so that the likelihood of stray coupling is very remote. A similar arrangement applies to the conductors of the stub cable 26.

The procedure for assembling and wiring the coils in the casing is as follows. The stub cables 25 and 26 are inserted in the glands 23 and 24 to extend the appropriate distance through the end plates 21 and 22 which are spaced by the support bars 30. After the wiped joints to the stub cables and glands have been made in known manner, the strengthening arrangements incorporating brackets 32 and 33 are fitted to hold the stub cables firmly in position. One row of say thirty coil assemblies 29, i. e. 180 coils, is then mounted on its supporting bar 30 and the clamping bar 31 attached to lock these units in position. The appropriate conductors from each cable can then be jointed to the corresponding coils, which at this stage are easily accessible. These connections may be made either in the spaces, such as 44, between coil units or on top of the coil units, the construction being adaptable to either method. The second row of coil units, which for compactness touches or is close to the first, is added and the appropriate connections made, the same procedure being adopted also for the third row.

After testing has been done, the casing 20 is slid on and welded to the endplates. The filling plugs 42 and 43, the location of which can best be seen in Fig. 4, are removed and the case is filled with hot wax compound, after which the filling plugs are inserted again.

It will be seen that this arrangement uses the available space within the container to great advantage. The branches of the stub cables diminish in thickness as they proceed along the rows of coil assemblies, and since the thickest end of the branches of one cable corresponds with the thinnest end of the branches of the other, these can be made substantially to fill all the space above the coils. As there are only 24 conductors at the most to pass into the spaces between the cylinders, adequate room is available for the necessary joint protecting sleeves if connections are to be made at the outlets of the screens.

It will be appreciated that the invention is not limited to the constructional details described or to the precise arrangements of the embodiment illustrated in the drawings, which are given by way of example. Certain modifications will be obvious to those skilled in the art which in no way detract from the spirit of the invention. For example, the method of securing the cylindrical coil units to their supporting members has various alternatives, a suitable one involving the use of retaining clips attached to the supports which grip the screening cylinders at their upper and lower rims.

The number of coils in one unit and the number of rows of coil units in the casing may be varied, the figures given in the foregoing description being those which appear suitable for the construction of a casing of compact dimensions. These details of layout will, of course, be modified in accordance with the number of coils to be accommodated and the shape of container required.

We claim:

1. A loading coil container including a plurality of screened coil assemblies each comprising a column of coils, a screening cylinder for each column of coils, a pair of parallel supporting bars between which the screening cylinders are mounted, said cylinders having slots in the edges thereof into which the supporting bars are adapted to fit for engaging and supporting the screening cylinder.

2. A container as claimed in claim 1 comprising, in addition, two end members therefor, means to connect the bars serving to support the loading coil assemblies to the end members, and a tubular outer casing secured to the end members.

3. A loading coil assembly comprising a plurality of loading coils mounted in a column on a common axis, means comprising a substantially rectangular stamping of springy metal rolled up to form a cylinder for supporting the coils and for secreening the coils from adjacent columns, and a metallic disc supported within the column between each individual coil to separate and screen the said individual coils of the column.

4. An assembly as claimed in claim 3 comprising, in addition, a soldering tag secured to each disc for facilitating electrical connection between said disc and the cylinder.

5. An assembly as claimed in claim 3 wherein the stamping is provided with a recess corresponding to each coil of the assembly, said recesses being adapted, when the stamping is rolled to form the cylinder, to provide openings for the passage of the connecting leads.

6. The assembly as claimed in claim 5 comprising, in addition, insulating grommets fitted into the openings and secured to the associated coils for protecting the connecting leads.

References Cited in the file of this patent

UNITED STATES PATENTS

| Number | Name | Date |
|---|---|---|
| 1,895,487 | Quinlan | Jan. 31, 1933 |
| 2,080,473 | Greenidge | May 18, 1937 |
| 2,084,123 | Bardsley | June 15, 1937 |
| 2,234,576 | Ranges | Mar. 11, 1941 |

FOREIGN PATENTS

| Number | Country | Date |
|---|---|---|
| 438,838 | Germany | Dec. 29, 1926 |